Sept. 2, 1952   J. W. BARRINGTON   2,608,904
OPHTHALMIC MOUNTING
Filed Dec. 2, 1948

INVENTOR.
JOHN W. BARRINGTON
BY
Louis L. Gagnon
ATTORNEY

Patented Sept. 2, 1952

2,608,904

UNITED STATES PATENT OFFICE 2,608,904

OPHTHALMIC MOUNTING

John W. Barrington, Rockville Centre, N. Y., assignor to American Optical Company, Southbridge, Mass., a voluntary association of Massachusetts Application December 2, 1948, Serial No. 63,059

4 Claims. (Cl. 88—41)

This invention relates to improvements in ophthalmic mountings and has particular reference to an improved lens supporting construction for such mountings and method of making the same.

One of the principal objects of this invention is to provide an ophthalmic mounting embodying a lens supporting structure having a pair of transverse lens supporting arms connected intermediately thereof by a bridge member, and having temple supporting members and nose pads also secured thereto, the ends of said arms having clamp means connected thereto for supporting the lenses independently of the bridge, temples or nose pads, such an arrangement of parts permitting a portion of any strain or stress which may be subjected to the bridge, temples or nose pads to be transmitted to and absorbed by the transverse arms without being directly transmitted to the lenses, with consequent lessening of lens breakage due to this condition.

Another object is to provide a lens supporting structure of the above character having lenses connected thereto by means embodying a substantially U-shaped lens clamp arrangement, said clamp arrangement embodying a pair of lens straps engaging opposite side surfaces of the lenses with one of the straps being provided with a projection adapted to engage a shallow depression in the adjacent lens surface and the other strap engaging the opposed lens surface for retaining the projection and depression in intimate relation.

Another important object is to provide a lens supporting structure having lenses connected thereto by means embodying a clamp arrangement of the above character formed entirely as a single self-contained unit permanently attached to the supporting structure, the clamp arrangement being used to immovably connect the lenses to the supporting structure without the necessity of drilling holes through the lenses or employing detachable items such as screws, rivets or the like.

Another object is the provision of a lens supporting structure having lenses connected thereto by connection means embodying a lens strap arrangement of the above character readily adaptable to lenses of varying thicknesses and contour shapes for clamping the lenses to retain them in the supporting structure.

Another object is to provide novel means and method of the above character for connecting lenses with a lens supporting structure whereby lenses may be quickly and easily attached to or detached from the structure with little resultant lens breakage, Another object is to provide novel means and method for supporting lenses in a lens supporting structure comprising initially forming a supporting structure embodying a bridge member attached at each end to intermediate portions of a pair of transverse supporting arms spaced rearwardly of and shaped to follow the upper contour edges of the lenses, said arms terminating in the nasal and temporal regions of the structure and having lens supporting straps formed rigidly with the ends thereof, said straps each being formed initially L-shaped with one strap arm thereof being provided with a short extension of a size and shape to snugly reside within a shallow opening formed in the adjacent side surface of the lens, after which the other strap arm is bent to engage the opposite side surface of the lens.

Other objects and advantages will become apparent from the following description taken in connection with the accompanying drawing, in which.

Figure 1:
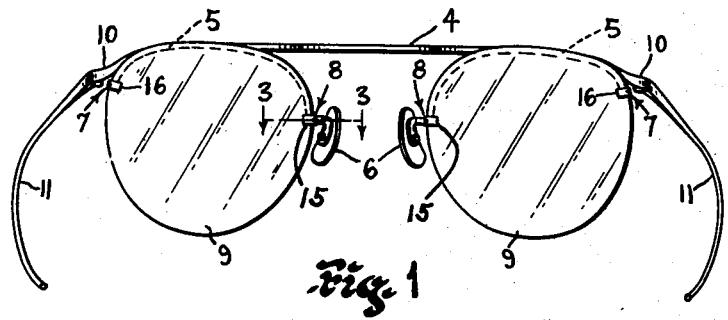
Fig. 1 is a front elevational view of an ophthalmic mounting embodying the invention.

The prior art teaches many different constructions of mountings and more particularly various means and methods of connecting the lenses with the supporting structure of such mountings. Among the various different means and methods of the prior art, there have been so-called rimless type mountings embodying a pair of lenses, a bridge member and temple endpieces, with the said bridge member and temple endpieces being secured to the lenses by lens straps of the type having an ear with a projection on the inner surface thereof adapted to fit within a depression formed in the adjacent lens surface and having an opposed ear member adapted to be bent to overlie the opposite surface of the lens and to thereby secure the strap to the lens and the associated part such as the bridge or endpiece carried by the strap.

In such prior art rimless structures, the strap members were the sole means for retaining the parts in connected and proper aligned relation with each other and when removed from the lens were separate and independent of each other. Strain directed to the straps, in all prior art instances, was transmitted directly to the lens, for example, the spreading of the temples in the act of removing or placing the mounting on the face were transmitted through the straps to the lenses. This caused considerable difficulty due to resultant breakage of lenses primarily due to the fact that in order to retain the parts in proper assembled and aligned relation with each other, the straps had to be very tightly secured in place on the lenses and such straps therefore in the past did not prove a commercial success even though they did afford means whereby the straps readily accommodated for lenses of different thicknesses. This latter feature, of course, is one which is extremely desirable in mountings of this nature.

With such prior art constructions, due to the fact that the straps were separate and independent of each other, there was always the danger of one of the straps and associated part becoming lost with the result that a complete mounting could not always be formed.

The present invention is directed to overcoming all of the undesirable characteristics which were inherent with mountings embodying straps of the above character while retaining the extremely desirable features of such straps, namely, that of not requiring any additional separate connection means such as screws, pins and tubes or the like and the feature of being readily accommodated for lenses of varying thicknesses and the ease and simplicity of assembling the lenses with the straps while removing the necessity of rigidly and tightly securing the straps to the lenses in order to properly retain the parts in proper assembled and aligned relation with each other and further through the provision of means normally retaining the straps in connected relation with each other whereby the supporting structure is a complete unitary unit embodying no separate parts for securing the lenses with said supporting structure and with said latter means removing all strain which might be transmitted through the bending or flexing of the bridge or temples during the use of the mounting.

Referring more particularly to the drawing wherein like characters of reference designate like parts throughout the several views, the device embodying the invention comprises broadly a lens supporting structure having a bridge member 4, a pair of transverse lens carrying arms 5, nose bearing pads 6 and temporal and nasal lens connection means 7 and 8 respectively. The transverse arms 5 are of an elongated and slender arcuately shaped nature formed preferably entirely or partially of a resilient material and are preferably adapted to be spaced slightly to the rear of and shaped to follow the upper contour edge of the lenses 9.

Rearwardly and outwardly extending temple connection arms 10 are fixedly secured to the transverse lens carrying arms 5 in the temporal regions thereof and have temples 11 hingedly connected thereto as by pins, screws or the like. The temple connection arms 10 are connected to an intermediate point of the arms 5 so that any strain such as might be imposed upon them, as by spreading the temples apart beyond the normal range permitted by the hinge connections, will be absorbed by the arms 5 and since there is no direct connection between the arms 10 and the lenses 9 no strain will be imposed upon the lenses.

Figure 2:
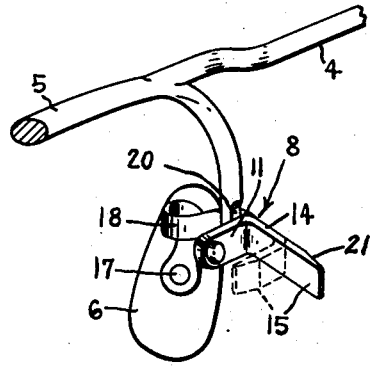
Fig. 2 is a fragmentary perspective view of a portion of the mounting with the lens removed to show particularly the lens strap arrangement.

Each of the nasal lens connection means 8 comprises a clamp member which is initially formed substantially L-shaped, having the rearwardly disposed strap 11 thereof fixedly attached as by soldering, welding or the like to the nasal end of the transverse lens carrying arms 5 as illustrated in Fig. 2. The strap 11 of the clamp member 8 is provided on its surface adjacent the lens 9 near the outer end thereof with a short projection 12 which, in assembling a lens 9 to the structure, is adapted to snugly reside within a shallow comating depression 13 formed in the rear side surface of the lens 9.

In attaching a lens to the structure, the lens 9 is brought into position with the nasal edge thereof in abutment with the bight portion 14 of the clamp member 8 and with the rear surface thereof against the strap 11. This will permit the projection 12 to enter the depression 13, after which the front strap 15 of the clamp member 8 is bent so as to engage the front surface of the lens 9 (Figs. 2 and 3) to thus firmly retain the lens 9 in place.

The temporal lens connections 7 are fixedly secured to the temporal ends of the transverse arms 5 and similarly comprise a clamp member having a pair of straps 16 adapted to engage opposed side surfaces of the lenses 9, the rear straps having projections similar to the projections 12, which projections are adapted to reside in depressions formed in the rear surface of the lenses in the temporal regions thereof similar to the depressions 13.

The mounting is adapted to be supported upon the face of the wearer by the nose pads 6 which are pivotally attached as at 17 to one end of adjustable supporting arms 18, which arms 18 are fixedly secured as by soldering or the like to the nasal ends of the transverse lens carrying arms 5 adjacent the nasal lens clamp members 8. The arms 18 carry the pads 6 substantially to the rear of the mounting and are preferably formed of a bendable material so that they may be adjusted to comfortably support the mounting upon the face of the wearer. By connecting the arms 18 to the arms 5 conjointly with the clamp members 8 no stress will be transmitted from the nose pads to the lenses, any strain therein being absorbed by the arms 5.

It will be understood that a lens may be quickly and easily detached from an assembled mounting by prying up the front arm of one of the clamp members 7 or 8, preferably the nasal member 8, sufficiently to permit disengagement of the projection 12 from the depression 13 and allow the lens to be rotated out of the effective area of the clamp member, and subsequently "springing" the lens out of the second clamp member.

The straps 11 and 15 of the nasal lens connecting clamp members 8 and their counterparts 16 of the temporal clamp members 7 are preferably shaped to have wide flat surfaces engaging the surfaces of the lenses 9, being, however, no wider than necessary to prevent pivoting of the lenses. However, it is desirable to maintain the width of the straps of the clamp members 7 and 8 as narrow as possible so that these will be a minimum of obstruction to the vision of the wearer of the mounting. Therefore, when constructing the mounting with narrow lens straps 11 and 15 it will be desirable to extend the nasal and temporal ends of each of the transverse lens carrying arms 5 downwardly below the point of attachment of the clamp members (Fig. 4) so as to have a portion 19 engaging the rear surface of the lens 9. This will prevent the lower portions of the lenses from tilting rearwardly about the lens connection means 7 and 8 and the arms 5 will similarly prevent tilting movement of the lenses in the opposite direction. Thus, upon imposition of a force applied directly to a lens, such a construction will cause the lens to absorb the shock rather than to pivot about the clamp members with consequent possible breakage.

Figure 4:
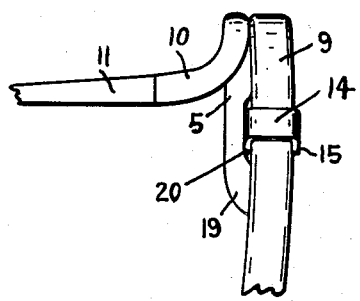
Fig. 4 is a fragmentary side elevational view showing a modification of the present invention.

As will be seen in Figs. 2 and 4, the nasal end portions of the transverse lens carrying arms 5 are preferably provided with flat areas 20 adjacent the points of attachment of the clamp members. This provides means for positioning the surface of the arms 5 against the adjacent surface of the lenses without the necessity of bending the arms 5 about the clamp members, and also provides means for obtaining a better seat for the clamp members when assembling them to the arms.

The straps of the clamp members 7 and 8 which are adapted to engage the rear surfaces of the lenses 9 may be initially angled to conform to the average lens curve or they may be angled to conform to each individual lens curve. By initially shaping the members 7 and 8 to substantial L-shapes this enables the front straps of the members to be subsequently bent to engage the front surfaces of the lenses and consequently they will automatically conform to the front surface curvatures thereof.

Figure 3:
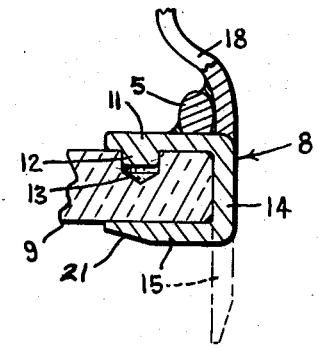
Fig. 3 is a fragmentary sectional view taken on line 3—3 of Fig. 1 and looking in the direction indicated by the arrows.

The front straps 15 and 16 of the clamp members 7 and 8 may be shaped to enhance the appearance of the assembled mounting such as by providing them with beveled surface areas 21, as shown in Figs. 2 and 3, or they may be suitably etched or otherwise provided with desirable surface characteristics.

By constructing an ophthalmic mounting in accordance with the foregoing it will be understood that there is provided improved means for supporting lenses in the supporting structure therefor, which means is simple and efficient and which permits lenses to be quickly and easily attached to or detached from the structure with little resultant breakage of the lenses. In this improved construction the lenses are efficiently supported in the structure by clamp-type connections which connections are entirely self-contained, not requiring the use of detachable and easily lost or misplaced loose items such as screws, rivets, washers, tubes or the like.

While the novel features of the invention have been shown and described and are pointed out in the annexed claims, it will be understood that various omissions, substitutions and changes in the construction and details of the device illustrated may be made by those skilled in the art without departing from the spirit of the invention.

I claim:

1. A lens supporting structure for use with a pair of lenses in an ophthalmic mounting having depressions formed in the rear surface thereof spaced inwardly of the respective adjacent nasal and temporal edges of said lenses, said supporting structure comprising a bridge having bar-like portions on its opposed sides to follow rearwardly along the contour of said lenses and carrying lens connection members adjacent the opposed ends thereof, said lens connection members each embodying a first strap portion having an inner side surface to engage the rear surface of one of said lenses and having a projection extending forwardly from said inner side surface of the strap portion to fit within a respective depression formed in the rear surface of said lens, said first strap portion being secured to a respective bar-like portion and said lens connection members each further having a second strap portion disposed normally to said first strap portion to extend transversely of the adjacent lens edge and being of a length in excess of the edge thickness of the lenses with which the structure is to be assembled, and said second strap portion being of a bendable nature whereby the outer end portion of said second strap portion extending beyond the front surface of the lens may be bent into bearing engagement with said front surface of the respective lens so as to retain the projections carried by the first strap portions in the respective depressions of the lenses to secure said lenses in assembled relation with said supporting structure.

2. An ophthalmic mounting comprising a pair of lenses having nasally and temporally located depressions in the rear surface thereof spaced inwardly of the respective adjacent nasal and temporal edges of said lenses, a bridge disposed intermediate said lenses and having a pair of bar-like portions on each side thereof following rearwardly along the top contour of said lenses and carrying a pair of nasally and temporally disposed lens connection members, said connection members each embodying a first strap portion having an inner side surface engaging the rear surface of one of said lenses and having a projection extending forwardly from the said inner side surface thereof and fitting within a respective depression formed in the rear surface of said lens, said first strap portion being secured to a respective bar-like portion and said lens connection members each further having a second strap portion carried by and disposed normally to said first strap portion and extending transversely of the adjacent lens edge, said second strap portion being of a length in excess of the edge thickness of the respective lens with which it is assembled, with the outer end portion of said second strap portion extending beyond the front surface of the lens being bent into bearing engagement with said front surface of the respective lens so as to retain the said projections on the first strap portions in the respective depressions of the lenses to maintain said lenses in assembled relation with said bar-like portions.

3. A lens supporting structure for use with a pair of lenses in an ophthalmic mounting each having nasally and temporally located depressions in the rear surface thereof spaced inwardly of the respective adjacent nasal and temporal edges of said lenses, said supporting structure comprising a bridge having bar-like supporting portions on its opposed sides to follow rearwardly along the contour of said lenses and carrying a pair of nasally and temporally located L-shaped lens connection members, said connection members each embodying a first strap portion having an inner side surface to engage the rear surface of one of said lenses and having a projection extending forwardly from said inner side surface thereof to fit within a respective depression formed in the rear surface of said lens, said first strap portion being secured to a respective bar-like portion inwardly from the end of said bar-like portion, and said lens connection members each further having a second strap portion disposed normally to said first strap portion to extend transversely of the adjacent lens edge and being of a length in excess of the edge thickness of the lenses with which the structure is to be assembled, and said second strap portion being of a bendable nature whereby the outer end portion of said second strap portion extending beyond the front surface of the lens may be bent into bearing engagement with said front surface of the respective lens so as to retain the said projections of the first strap portions in the respective depressions of the lenses to maintain them in assembled relation with said supporting structure.

4. An ophthalmic mounting comprising a pair of lenses having nasally and temporally located depressions in the rear surface thereof spaced inwardly of the respective adjacent nasal and temporal edges of said lenses, a bridge disposed intermediate said lenses, bar-like portions secured on opposed sides of said bridge to follow rearwardly along the top contour of said lenses and having recesses formed on the lens directed side thereof and inwardly from the ends thereof, temple connection means adjacent the outer ends of said bar-like portions, and a pair of nasally and temporally located lens connection members each embodying a first strap portion having an inner side surface to engage the rear surface of one of said lenses and having a projection extending forwardly from the said inner side surface thereof to fit within a respective depression formed in the rear surface of said lens, said first strap portion being secured within a recess adjacent the end of said bar-like portions, and said lens connection members each further having a second strap portion of bendable nature disposed normally to said first strap portion to extend transversely of the adjacent lens edge and being of a length in excess of the edge thickness of said lens, the outer end portion of said second strap portion extending beyond the front surface of the lens being bent into bearing engagement with said front surface of the respective lens so as to retain the projection in the depression and the lens in assembled relation with said supporting structure, and said end portions of the respective bar-like portions extending below the recesses formed therein substantially engaging the adjacent rear surface of the lens.

JOHN W. BARRINGTON.

REFERENCES CITED

The following references are of record in the file of this patent:

UNITED STATES PATENTS

| Number | Name | Date |
| --- | --- | --- |
| 2,244,926 | Uhlemann | June 10, 1941 |
| 2,250,243 | Williams | July 22, 1941 |
| 2,257,811 | Pomeranz et al. | Oct. 7, 1941 |
| 2,257,812 | Pomeranz | Oct. 7, 1941 |
| 2,277,118 | Leavitt | Mar. 24, 1942 |
| 2,439,357 | Bouchard | Apr. 6, 1948 |
| 2,456,293 | Markell | Dec. 14, 1948 |